United States Patent [19]

Nabiulin et al.

[11] Patent Number: 5,722,251
[45] Date of Patent: Mar. 3, 1998

[54] AIR COOLER

[75] Inventors: Fatim Nabiulin, Rishon-LeZion; Alexander Stepanov, Yavne; Igor Kvyat; Isaac Rosenstein, both of Rishon-LeZion; Vladislav Dintcyn, Bney-Brak, all of Israel

[73] Assignee: Coolsys Maarachot Keroor Mitkadmot B.M., Yavne, Israel

[21] Appl. No.: 619,282

[22] Filed: Mar. 18, 1996

[30] Foreign Application Priority Data

Mar. 22, 1995 [IL] Israel ........................................ 113078

[51] Int. Cl.$^6$ .................................................... F25D 17/04
[52] U.S. Cl. .................................................... 62/309; 62/310
[58] Field of Search ............................ 62/304, 309, 314, 62/310; 261/133, 94, 153

[56] References Cited

U.S. PATENT DOCUMENTS 4,660,390  4/1987  Worthington ........................... 62/309
4,713,943  12/1987  Wainwright ............................ 62/304

OTHER PUBLICATIONS

Abstract of Israeli Patent No., 85817, Lev Vinokurov, Mar. 3, 1988.

*Primary Examiner*—William Doerrler
*Attorney, Agent, or Firm*—Steinberg, Raskin & Davidson, P.C.

[57] ABSTRACT

An air cooler including a housing having an air inlet zone and an air outlet zone, a heat exchanger mounted in the housing and defining a first plurality of dry channels extending from the air inlet zone to the air outlet zone. Air is passed through the dry channels from the inlet zone to the outlet zone to be cooled and the cooled air constitutes a total airflow. The heat exchanger also defines a second plurality of moist channels each having an inlet and an outlet and alternating with the dry channels. The moist channels are intended for passing the air to be humidified from their inlets to their outlets and in cross-flow direction to the direction of the total airflow. The air to be humidified constitutes an auxiliary airflow which is formed from a part of the total airflow at the air outlet zone and is extracted from such a section of the air outlet zone, which is situated closer to the outlets of the moist channels than to their inlets.

11 Claims, 4 Drawing Sheets

AIR COOLER

CROSS REFERENCE TO RELATED APPLICATIONS

The present application is a convention application to the original Israel patent application No. 113078 filed on Mar. 22, 1995.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

The present invention relates to an air cooler based on the principle of indirect cooling by evaporation.

In one type of known air coolers the air to be dispensed to a user's room is passed through a heat exchanger from its inlet to its outlet via so called "dry channels", i.e. without altering the air's humidity; the air passing through the dry channels and constituting a main airflow, is indirectly cooled by an evaporation chamber comprising so called "moist channels" placed adjacent to the dry channels. The air conveyed through the moist channels is taken from the user's room (where the chilled air is already mixed with the ambient air) and constitutes an auxiliary airflow which is humidified by any means, such as water sprayers. An air cooler of this type is described, for example, in the U.S. Pat. No. 4,713,943. It is understood, that the main airflow in such a cooler can be chilled to a temperature no lower than the value which could be achieved if a direct evaporative cooling of this airflow was provided, i.e. no lower than its wet-bulb temperature.

The minimal temperature of the chilled main airflow can be further lowered in another type of air cooler, where the initial temperature of the air to be humidified in the evaporation chamber is decreased by directing to the moist channels a part of the chilled airflow escaping from the dry channels of the heat exchanger. In this type of air cooler the minimal theoretically obtainable temperature of the main airflow is its dew-point temperature. An example of such an exchanger is represented by U.S. Pat. No. 4,660,390. It describes an air conditioner comprising a cabinet defining an internal heat exchanger and an internal evaporation chamber with water spraying means, the cabinet having an air inlet zone and an air outlet zone. The auxiliary airflow passing in the evaporation chamber vertically, from the bottom upwards, is perpendicular to the main airflow passing horizontally in the heat exchanger; simultaneously, a specific part of the dry main airflow emerging from the outlet of the heat exchanger is directed to the evaporation chamber. In accordance with the design described in this patent, a conduit directing the mentioned part of the dry airflow into the evaporation chamber is mounted between the input portion of the evaporation chamber and the lower part of the air outlet zone of the heat exchanger. One of the considerations for doing so was to design the shortest conduit for diverting such an additional airflow. Another consideration could be that the air taken from the lower part of the outlet zone and having the temperature lower than that of the air taken from its upper part, should provide more effective further cooling if directed to the evaporation chamber. The fact that the lower part of the outlet zone of the main airflow is characterized by the lower temperature, can be explained by a known rule, that in a heat exchanger the maximal temperature gradient along one flow is created near the inlet cross-section of another flow. In this particular case the maximal temperature gradient in the dry path of the heat exchanger is created at the lower part of this path, i.e. near the entry of the auxiliary airflow to the evaporation chamber.

However, the dislocation of the air diverting conduit as described in the U.S. Pat. No. 4,660,390 actually does not provide effective cooling of the main airflow, due to the following reason. The heat exchanging process in the described device develops under conditions when the difference of temperatures at the inlets of the device (i.e. the difference between the ingressing main airflow and the ingressing auxiliary airflow) is maximal, and the difference of temperatures between the same emerging airflows at the outlets of the cooler is minimal. Such a combination of parameters is typical for rather ineffective heat exchanging systems with uni-directed main and auxiliary flows. It should be mentioned, that heat exchangers with oppositely directed flows are known to be much more effective.

Another disadvantage of the described air coolers is inefficacy of humidifying means, which is caused by great consumption of water and energy due to nonuniform moistening of the inner walls of the moist channels.

BRIEF SUMMARY OF THE INVENTION

It is therefore an object of the present invention to provide an air cooler being free from the above mentioned disadvantages.

The above object can be achieved by the present invention which provides an air cooler comprising a housing having an air inlet zone and an air outlet zone, and including a heat exchanger defining a first plurality of dry channels extending from said air inlet zone to said air outlet zone and serving for passing, in the same direction, the air to be cooled which constitutes a total airflow;

said heat exchanger also defining a second plurality of moist channels each having an inlet and an outlet and alternating with said dry channels; said moist channels being intended for passing the air to be humidified in cross-flow direction to the direction of the total airflow; said air to be humidified constitutes an auxiliary airflow and is being formed from a part of said total airflow at the air outlet zone; a remaining part of the total airflow constituting a conditioned airflow fed to a user's point;

said housing also includes an air diversion means for dividing said total airflow at the air outlet zone into said auxiliary airflow and said conditioned airflow, and for directing said auxiliary airflow to the inlets of said moist channels;

a water distributing chamber mounted on the heat exchanger and communicating with the open outlets of said moist channels;

said air diversion means extracting said auxiliary airflow from such a section of the air outlet zone, which section is situated closer to the outlets of said moist channels than to their inlets.

In the preferred embodiment of the invention said section of the air outlet zone is situated in close proximity to the water distributing chamber.

The efficiency of the described air cooler is substantially improved in comparison with the prior art, due to the following effect. As was mentioned above, temperature of the main airflow escaping from the heat exchanger, being in general lower than the temperature of the ingressing total airflow, is non-uniform over the outlet zone; more particularly, temperature in the zone's section situated close to the inlets of the moist channels is lower than in the rest of the zone. It should also be added that, in any design of a cooler of the type described, the auxiliary flow ingressing into the moist channels and passing there-along, on the one hand undergoes humidifying and, on the other hand, gradually gets heated by the total airflow passing through the dry channels in the heat exchanger. It has been found that, if the colder part of the airflow emerging from the dry channels is directed to a point of use, and the warmer part, after being collected close to the outlets of the moist channels, is diverted to the inlets of the moist channels to form an auxiliary airflow, the difference between temperatures of the total and auxiliary ingressing airflows will be decreased, while simultaneously it will become close to the difference between temperatures of the main and auxiliary emerging airflows. Such a combination of parameters is inherent in heat exchangers with oppositely directed flows. It can thus be seen that, the present air cooler having perpendicularly directed airflows, simulates operation of the most effective heat exchangers with oppositely directed flows.

In accordance with a preferred embodiment of the invention said air diversion means comprises a first air collector positioned at said section of the outlet zone and intended for collecting said auxiliary airflow, and a second air collector communicating with the inlets of said moist channels; said air diversion means also including at least one air duct connecting said first and said second air collectors to one another.

The moist channels of the above-described heat exchanger may have hydrophilic inner walls. Moreover, evaporation will be more effective if the inner walls are covered with a water-holding layer, such as fabric or sponge.

According to a still further embodiment of the invention said water distributing chamber comprises a water dispensing roller provided with an outer layer of a flexible water-holding material; said roller is adapted to be moistened and is rotationally displaceable to and fro over the open outlets of said plurality of the moist channels.

BRIEF DESCRIPTION OF THE DRAWINGS

The present invention will be further described and illustrated with the reference to the attached non-limiting drawings, in which.

DESCRIPTION

Figure 1:
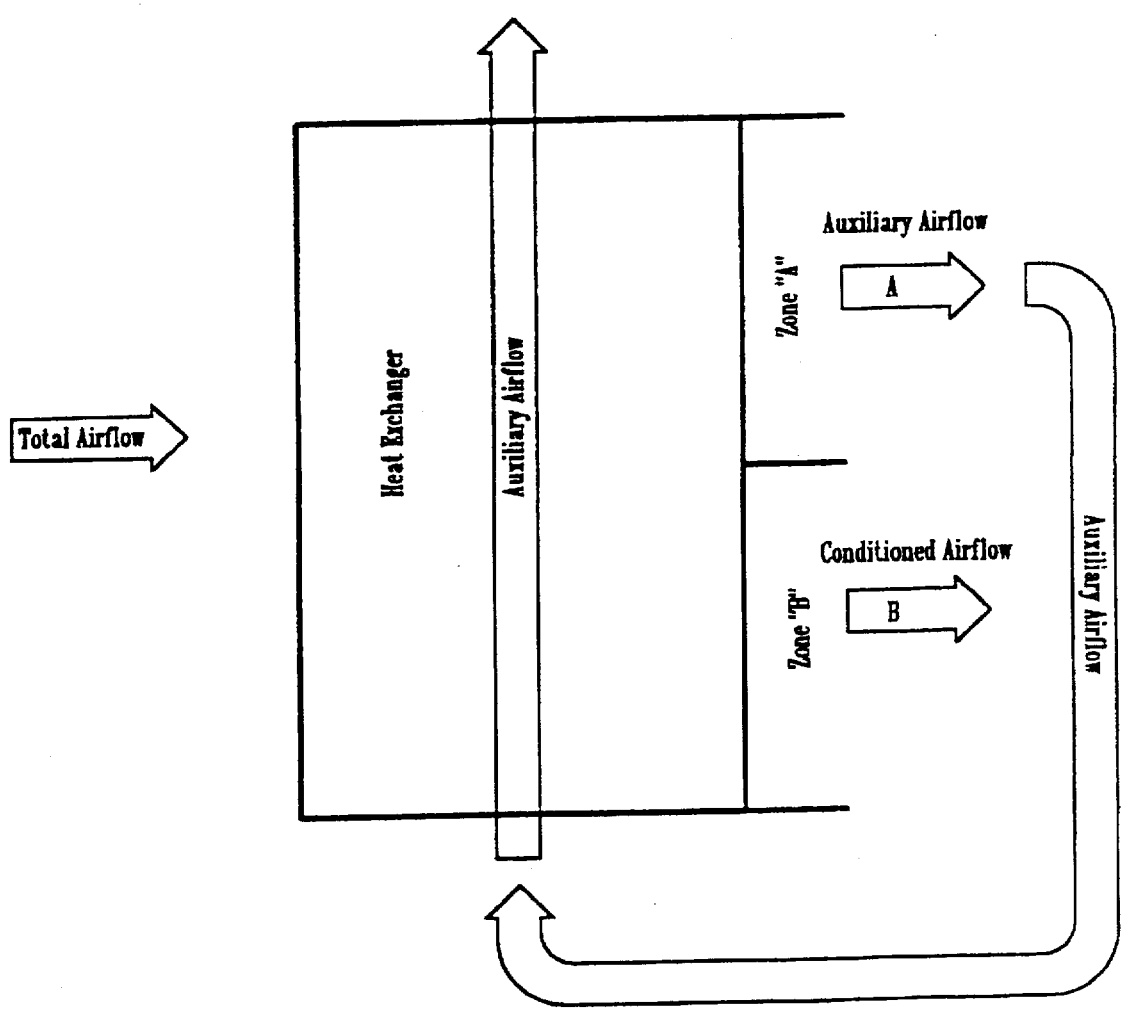
FIG. 1 is a schematic diagram of airflows used in the air cooler according to the invention.

FIG. 1 illustrates the combination of airflows in the air cooler according to the invention. A total (dry) airflow continuously ingress a heat exchanger, passes via a horizontal air path, and after being indirectly cooled by an auxiliary (moist) airflow, which is conducted via a vertical air path, emerges from the heat exchanger, where it is divided into two portions A and B. The portion A of the cooled total airflow, taken from zone A, which zone is situated near the outlet of the auxiliary airflow, is continuously directed back to the heat exchanger and maintains the above-mentioned auxiliary airflow. The portion B of the cooled total airflow is continuously dispensed to the point of use and forms a conditioned airflow.

Figure 2:
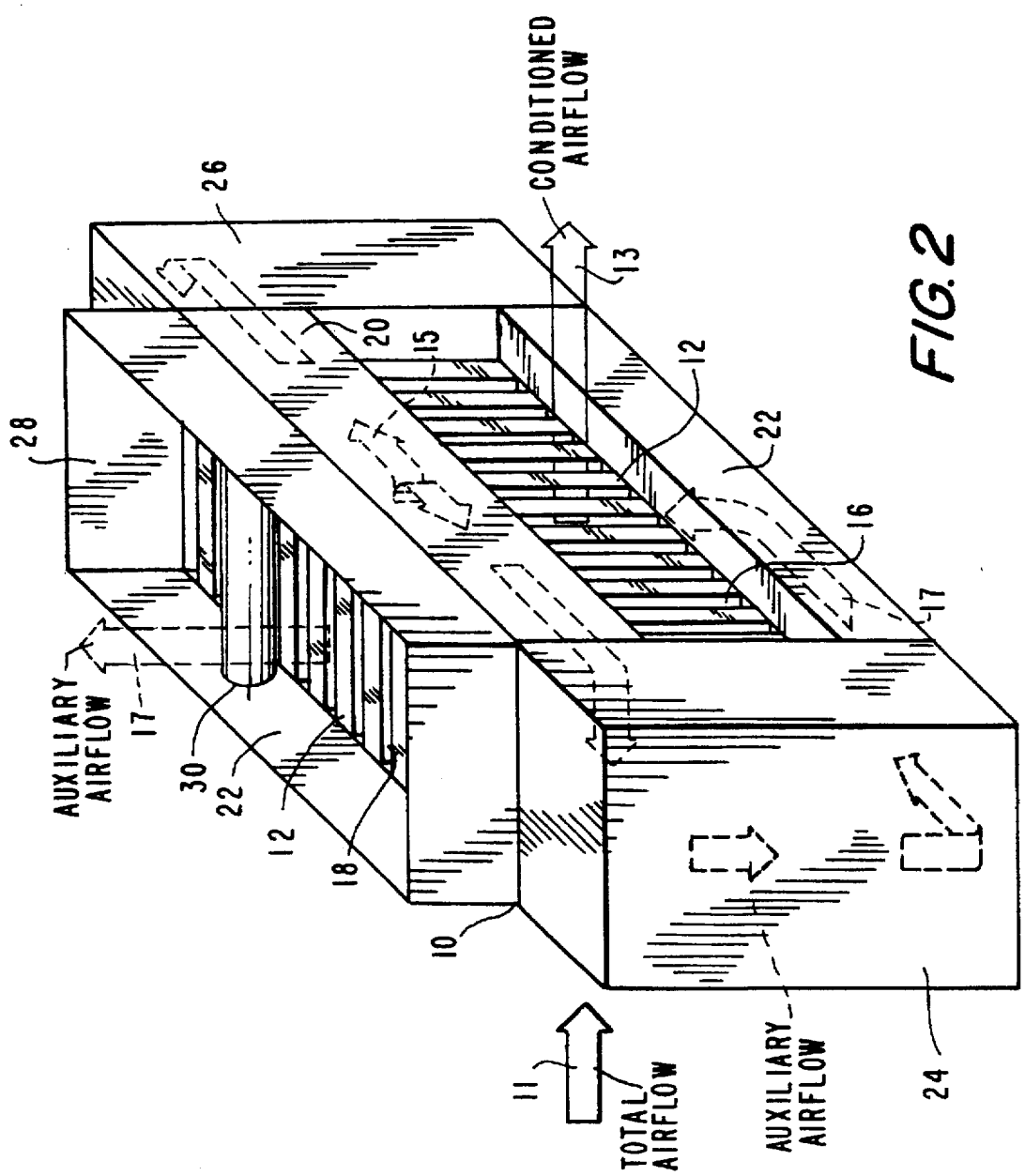
FIG. 2 is a perspective view of the preferred embodiment of the air cooler according to the invention.

FIG. 2 illustrates the preferred embodiment of the air cooler according to the invention.

Figure 4:
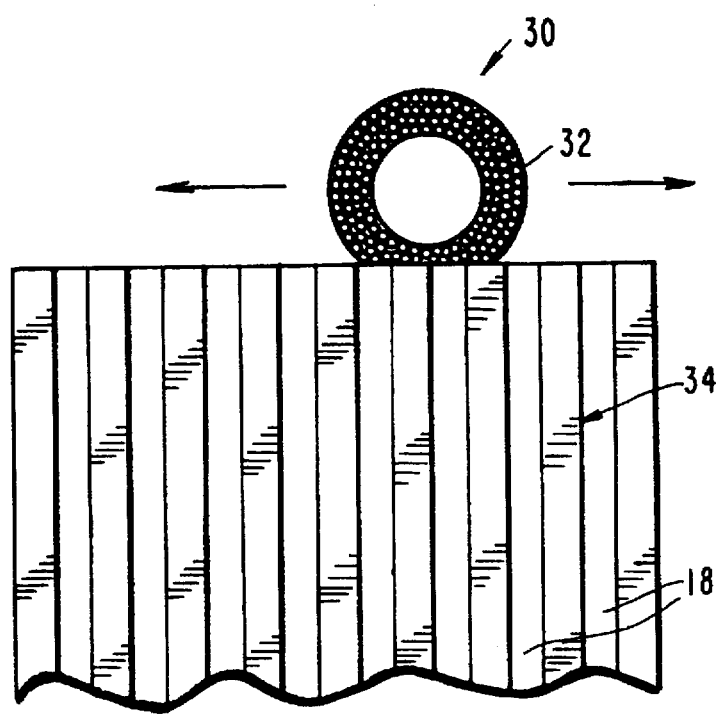
FIG. 4 is an enlarged cross-sectional view of the humidifying means according to the invention.

The air cooler is contained in a housing 10, enclosing a heat exchanger 12 and a water spreading (water distributing) chamber marked 28. The inlet zone of the air cooler is pointed out with an incoming solid arrow 11 of the total airflow ingressing the heat exchanger 12. From the outlet zone of the heat exchanger 12 emerge two airflows 13 and 15 constituting parts of the chilled total airflow 11. The conditioned airflow 13 is indicated with an outcoming solid arrow 13, and the airflow indicated with horizontal outcoming dotted arrows 15 is intended for converting thereof into an auxiliary humidified airflow 17. The heat exchanger 12 comprises a number of so-called dry channels 16 extending horizontally and intended for the total airflow; the dry channels 16 alternate with so called moist channels 18 extending vertically and intended for the auxiliary airflow 17. The housing 10 is provided with a first air collector 20 placed at the upper portion of the outlet zone of the cooler and collecting the airflow 15. The inlets of the moist channels 18 are enveloped with a second air collector 22. The airflow 15 constituting a portion of the cooled air emerging from the exchanger and being continuously collected by the first air collector 20, is further directed to the second air collector 22 via two symmetric conduits 24 and 26 mounted at two opposite sides of the housing 10. The airflow 15, after being diverted by the collector 20 and directed downwards by the conduits 24 and 26 and the collector 22, forms an auxiliary airflow, shown by a vertical dotted arrow 17, which is further conveyed through the moist channels 18 of the heat exchanger, and then out from the cooler. The auxiliary airflow 17 is humidified by the aid of the water spreading chamber 28. The water chamber is intended to ensure the moist evaporation in moist channels 18, the walls thereof will be thus chilled, causing the indirect cooling of the total airflow in the dry channels 16. The water spreading chamber 28 is mounted so as to communicate with the open outlets of the moist channels 18. This chamber 28 is shown schematically and in this particular embodiment comprises a water dispensing roller 30 which is rotatably displaceable along the outlets of the moist channels 18. The water spreading chamber 28 is shown in detail in FIG. 4, where one can see that the roller 30 consists of a sponge-like hydrophilic and water-holding sleeve 32. The inner walls of the moist channels 18 are also covered by a thin layer of a hydrophilic and water-holding material 34. The dry channels 16, closed from above, are darkened. The water may be supplied to the roller 30 along its axis of rotation. During the rotational displacement of the roller 30 along the outlets of the channels 18, the water is squeezed out from the layer 32 and is uniformly distributed along the hydrophilic layers 34 of the moist channels. The water consumption is thus lowered, and the evaporation efficiency raised in comparison with those humidifying means where the water spraying principle is utilized.

Figure 3A:
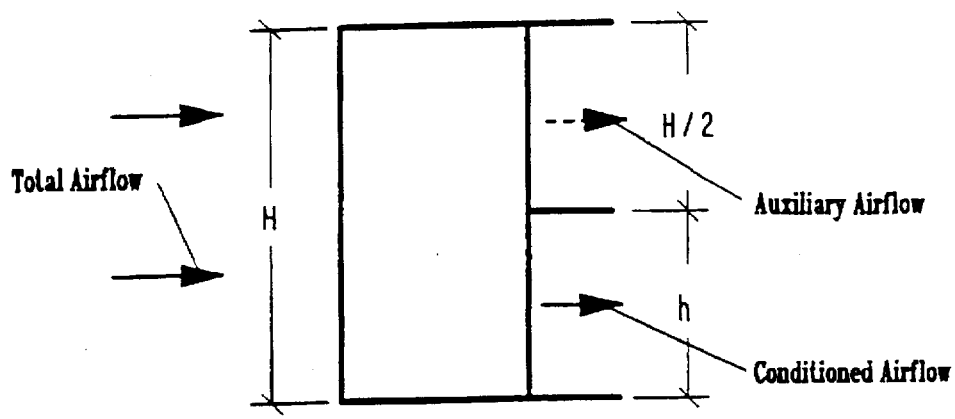
FIG. 3A is a diagram illustrating one of the possible positions of a first air collector on the housing of the air cooler shown in FIG. 2.

FIG. 3A illustrates schematically one of possible positions of the air collector 20 on the housing 10 of the air cooler shown in FIG. 2. As one may recall, the collector 20 is responsible for a partial withdrawal of air from the emerging dry airflow, and forming the auxiliary airflow. The height, both of the inlet and the outlet zones of the air cooler, is schematically marked with H; in this particular example the height of the air collector 20 has been chosen to be H/2. According to the investigations accomplished by the Inventors and shown in the form of a diagram in FIG. 3B, the preferred position of the collector 20 is at the upper half of the air outlet zone of the cooler.

Figure 3B:
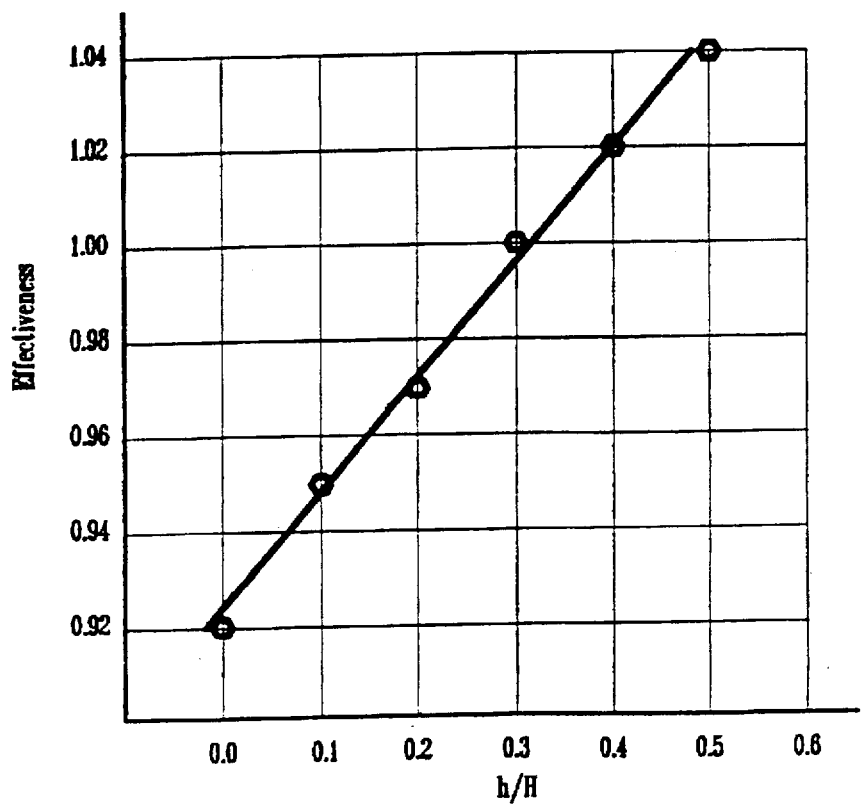
FIG. 3B is a diagram illustrating dependence of effectiveness of the air cooler according to the invention from the position of the first air collector.

FIG. 3B reflects dependence of the efficiency "K" of the described air cooler from disposition of the section, from which the auxiliary airflow is extracted. More particularly, this placement is characterized by elevation "h" of the bottom wall of the air collector 20 relative to the total height "H" of the air outlet zone. (In FIG. 3A there is shown the extreme position of such an elevation "h", being equal H/2.)

In general, efficiency of an air cooler is defined by the following equation:

$$K = \frac{T1(ingr \cdot dry) - T2(emerg \cdot dry)}{T1(ingr \cdot dry) - T3(ingr \cdot hum)}$$

where:
the numerator of the equation reflects the difference between the dry-bulb temperature T1 of the total airflow ingressing the cooler, and the dry-bulb temperature T2 of the chilled airflow dispensed to the point of use;
the denominator reflects the psychrometric drop of the ingressing total airflow which is constant for the air available at the time, and constitutes the difference between the two characteristic temperatures of this air: T1 being its dry-bulb temperature, and T3 being its wet-bulb temperature.

The value of "K" tends to 1, when a direct evaporative cooling of the air is utilized, i.e. when the temperature T2 becomes equal to T3. However, if the ingressing total airflow is indirectly cooled according, for example, to the scheme described in U.S. Pat. No. 4,660,390, the denominator will remain unchanged, while the difference in the numerator will increase due to the fact that the minimal value of T2 in this scheme is a dew point of the ingressing air, which dew point temperature is lower than T3. Consequently, the value of "K" for such an air cooler theoretically may exceed 1 but, due to its actual construction described in the prior art, it is hardly achievable.

The attention will now be directed to the present invention. The diagram in FIG. 3B clearly illustrates that, the efficiency of the described air cooler essentially increases and exceeds 1 when the position of the air collector 20 nears closer to the top of the cooler's outlet zone. The diagram is constructed for the ingressing air having an initial dry-bulb temperature of 27°, and initial relative humidity of 40%. For these particular conditions the efficiency of the described air cooler will be up to 13% higher than the efficiency of the device according to the mentioned U.S. Pat. No. 4,660,390.

We claim:

1. An air cooler comprising
a housing having an air inlet zone and an air outlet zone,
a heat exchanger arranged in said housing and defining a first plurality of dry channels extending from said air inlet zone to said air outlet zone and through which air to be cooled is passed in the same direction, the air to be cooled constituting a total airflow, said air outlet zone of said housing being exterior of said dry channels of said heat exchanger; said heat exchanger also defining a second plurality of moist channels each having an inlet and an outlet, said moist channels being arranged in an alternating relationship with said dry channels; said moist channels being structured and arranged to pass air to be humidified in a cross-flow direction to the direction of the total airflow; said air to be humidified constituting an auxiliary airflow and being formed from a partial flow of said total airflow after exiting from said dry channels into the air outlet zone exterior of said dry channels of said heat exchanger; a remaining part of the total airflow constituting a conditioned airflow fed to a user's point;
air diversion means arranged in said housing for dividing said total airflow at the air outlet zone exterior of said dry channels of said heat exchanger into said auxiliary airflow and said conditioned airflow, and for directing said auxiliary airflow from said air outlet zone exterior of said dry channels of said heat exchanger directly to the inlets of said moist channels without interaction with another air stream; and
a water distributing chamber mounted on the heat exchanger and communicating with the open outlets of said moist channels;
said air diversion means structured and arranged to extract said auxiliary airflow from a section of the air outlet zone which is situated closer to the outlets of said moist channels than to the inlets of said moist channels.

2. An air cooler of claim 1, wherein said section of the air outlet zone is situated in close proximity to the water distributing chamber.

3. An air cooler of claim 1, wherein said air diversion means comprises a first air collector positioned at said section of the air outlet zone and intended for collecting said auxiliary airflow, and a second air collector communicating with the inlets of said moist channels; said air diversion means also including at least one air duct connecting said first and said second air collectors to one another.

4. An air cooler of claim 1, wherein said moist channels have hydrophilic inner walls.

5. An air cooler of claim 1, wherein inner walls of said moist channels are covered with a water-holding layer.

6. An air cooler of claim 4 wherein said water distributing chamber comprises a water dispensing roller provided with an outer layer of a flexible water-holding material; said roller is adapted to be moistened and is rotationally displaceable to and fro over the open outlets of said plurality of the moist channels.

7. The air cooler of claim 1, wherein said air diversion means comprise a conduit arranged at each side of said housing between said air inlet zone of said housing and said air outlet zone of said housing, said auxiliary airflow being directed from said air outlet zone exterior of said dry channels of said heat exchanger through said conduits to the inlets of said moist channels.

8. An air cooler for cooling air and directing the cooled air to a room space, comprising
a housing having an air inlet zone and an air outlet zone,
a heat exchanger arranged in said housing and defining a first plurality of dry channels extending from said air inlet zone to said air outlet zone and through which air to be cooled in passed in the same direction, the air to be cooled constituting a total airflow, said heat exchanger also defining a second plurality of moist channels each having an inlet and an outlet and alternating with said dry channels, said moist channels having hydrophilic inner walls, air to be humidified being passed through said moist channels in a cross-flow direction to the direction of the total airflow, the air to be humidified constituting an auxiliary airflow and being formed from a part of said total airflow at the air outlet zone, a remaining part of the total airflow constituting a conditioned airflow fed to the room space, air diversion means arranged in said housing for dividing said total airflow at the air outlet zone into said auxiliary airflow and said conditioned airflow and for directing said auxiliary airflow to the inlets of said moist channels, said air diversion means extracting said auxiliary airflow from such a section of the air outlet zone which is situated closer to the outlets of said moist channels than to the inlets of said moist channels, and means defining a water distributing chamber in the heat exchanger and communicating with the outlets of said moist channels, said water distributing chamber comprising a water dispensing roller provided with an outer layer of a flexible water-holding material, said roller being adapted to be moistened and rotationally displaced over the outlets of said moist channels.

9. The air cooler of claim 8, wherein said section of the air outlet zone is situated in close proximity to said water distributing chamber.

10. The air cooler of claim 8, wherein said air diversion means comprises a first air collector positioned at said section of the air outlet zone and intended for collecting said auxiliary airflow, and a second air collector communicating with the inlets of said moist channels, said air diversion means also including at least one air duct connecting said first and said second air collectors to one another.

11. The air cooler of claim 8, wherein said air diversion means comprise a conduit arranged at each side of said housing between said air inlet zone of said housing and said air outlet zone of said housing, said auxiliary airflow being directed from said air outlet zone exterior of said heat exchanger through said conduits to the inlets of said moist channels.

* * * * *